Oct. 16, 1962 C. B. STAIR 3,058,781
EMERGENCY BRAKE ACTUATOR
Filed March 15, 1960 3 Sheets-Sheet 1

INVENTOR.
Carlyle B. Stair,
BY
Harold J. LeVesconte
Atty.

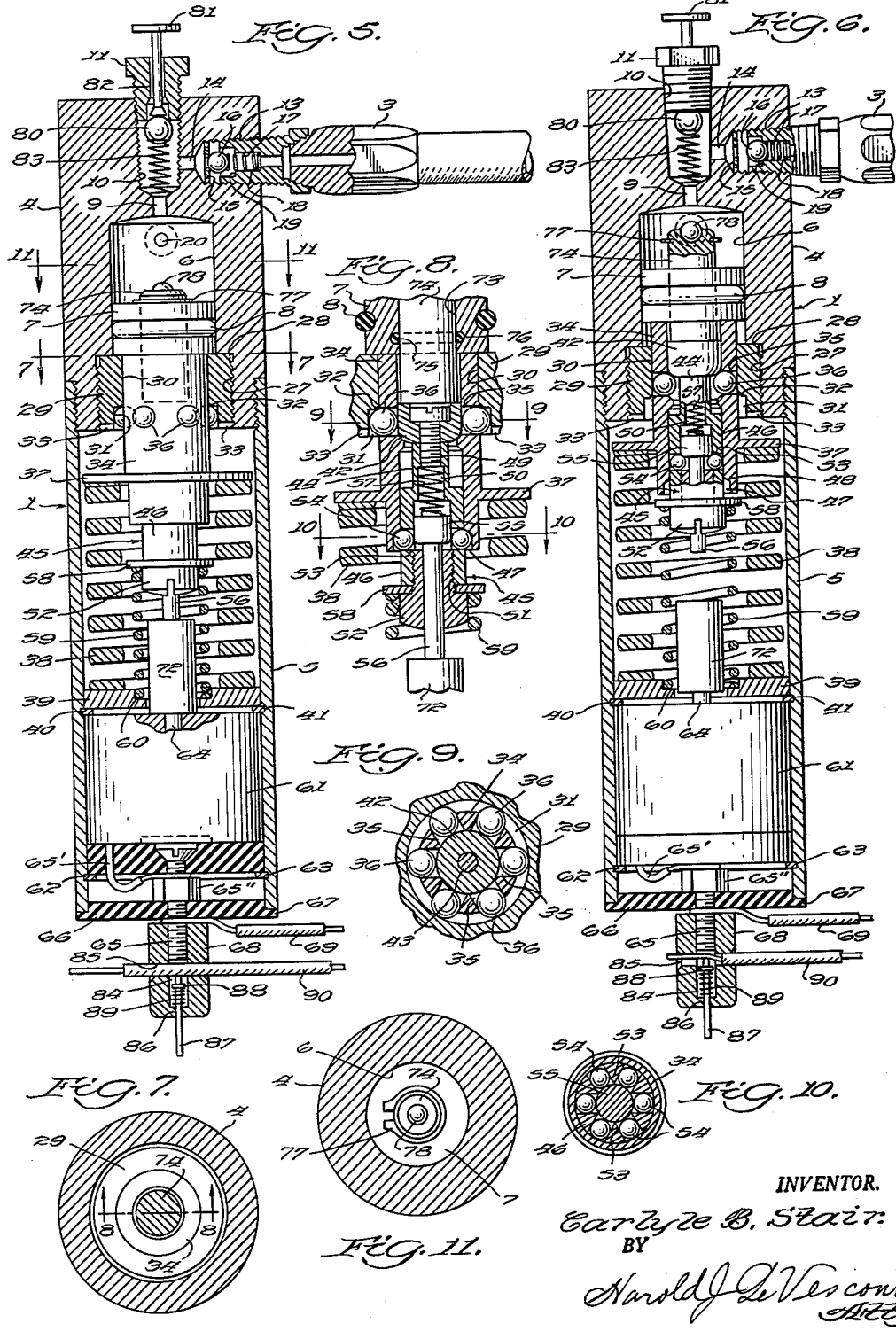

Oct. 16, 1962
C. B. STAIR
3,058,781
EMERGENCY BRAKE ACTUATOR
Filed March 15, 1960
3 Sheets-Sheet 3
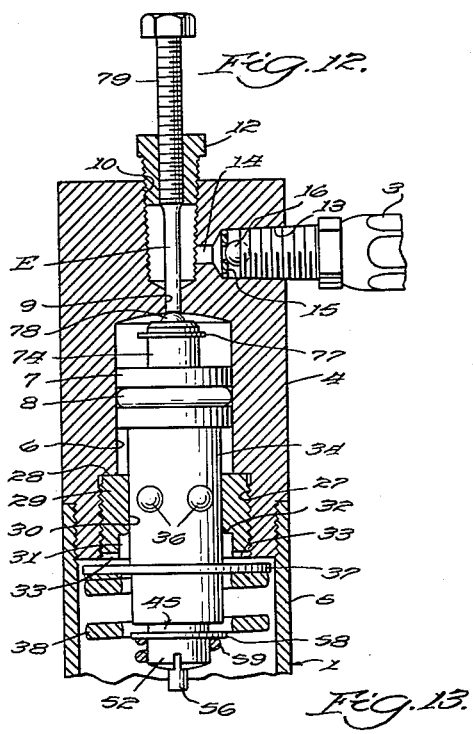
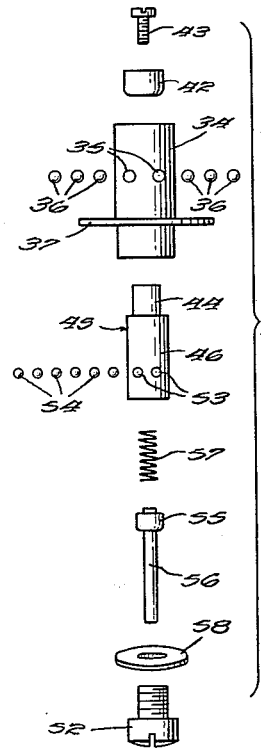
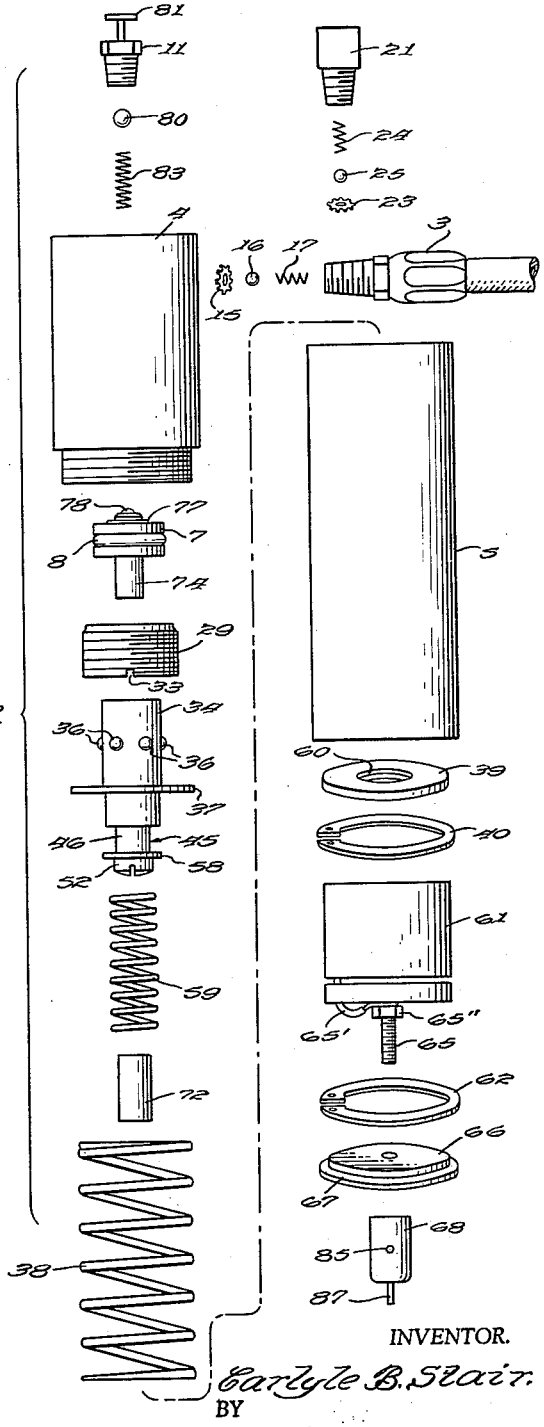
INVENTOR.
Carlyle B. Stair
BY
Harold J. LeConte
Atty.

United States Patent Office 3,058,781
Patented Oct. 16, 1962

3,058,781
EMERGENCY BRAKE ACTUATOR
Carlyle B. Stair, 3109 Buckingham Road, Glendale, Calif.
Filed Mar. 15, 1960, Ser. No. 15,146
8 Claims. (Cl. 303—2)

This invention relates to vehicle brakes and more particularly to an improved emergency operating means for trailer brakes.

An object of the invention is to provide an emergency operating means for vehicle brakes which is normally maintained in inoperative condition but possessing stored power effective, upon release, to apply the brakes and simultaneously to shut off communication between the portion of the braking system actuated by the invention and the master cylinder.

Another object of the invention is to provide an emergency operating means for trailer brakes including stored power actuating means and normally latched means for releasing the stored power means including latch releasing devices under the control of the driver of the towing vehicle and other latch releasing devices automatically actuated by breakaway separation of the vehicles.

A further object of the invention is to provide an emergency operating means for motor vehicle or trailer brakes including normally restrained spring means and electrically energized devices for releasing the force of the spring means adapted for operative connection with the electrical system of the towing vehicle.

Still another object of the invention is to provide an emergency operating means for motor vehicle or trailer brakes which can be installed as a unit by interposition in the brake operating fluid conduit means of the braking system.

A still further object of the invention is to provide an emergency operating means for motor vehicle or trailer brakes in which all of the foregoing objectives are realized in practice, which is sturdy and simple in construction, is economical to manufacture, is readily installed on the motor vehicle or the trailer and is effective for its intended purpose.

Figure 1:
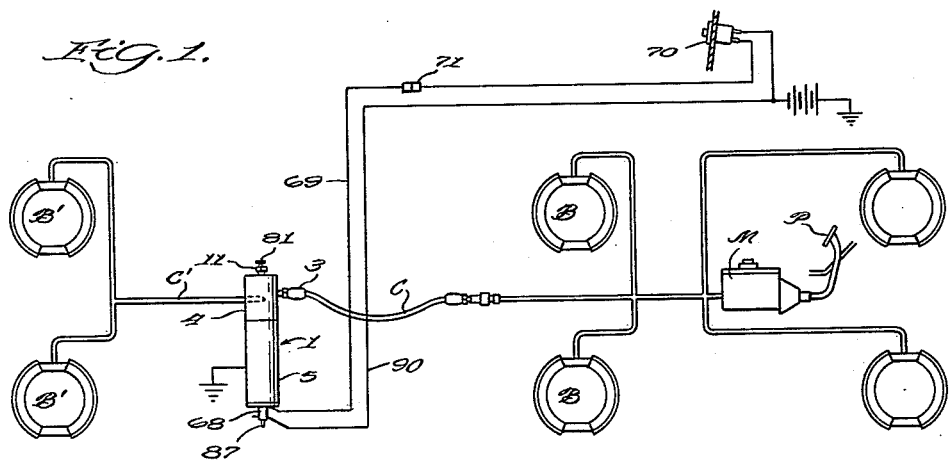
Figure 2:
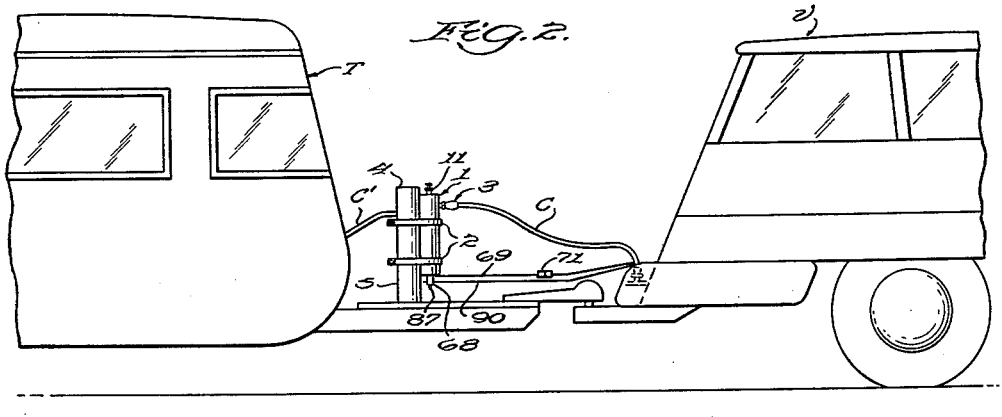
Figure 3:
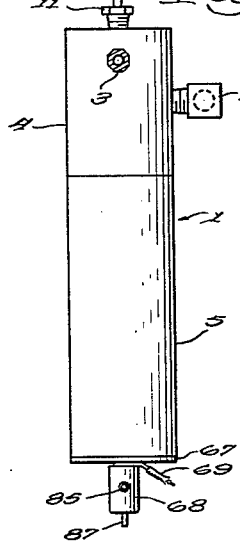
Figure 4:
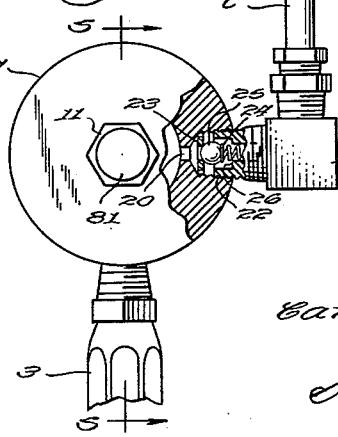
Figure 1A:
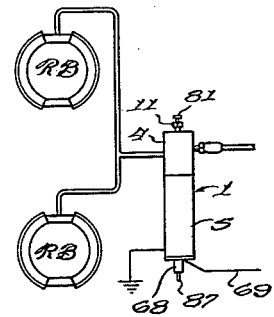

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a schematic view of the connected systems of a towing vehicle and the trailer with the unit and control means for the unit of the present invention interposed in the fluid conduit means extending between the braking systems of the vehicles, FIG. 1a is a similar schematic view showing the installation of the invention in the braking system of a motor vehicle, FIG. 2 is a side elevational view of the adjacent ends of the connected vehicles showing the unit of the present invention installed on the trailer tongue jack post, FIG. 3 is an enlarged, front elevational view of the brake operating unit, FIG. 4 is a further enlarged, top plan view of the unit shown in FIG. 3, FIG. 5 is a longitudinal, medial, sectional view taken on the line 5—5 of FIG. 4 and showing the device in its normal, inoperative position, FIG. 6 is a view similar to FIG. 5 but showing the relation of the parts when the device is rendered operative, FIG. 7 is a transverse, sectional view taken on the line 7—7 of FIG. 5, FIG. 8 is a fragmentary, further enlarged, medial, sectional view taken on the line 8—8 of FIG. 7 and showing the interior construction of the latching and latch releasing means, FIG. 9 is a fragmentary, transverse, sectional view of the primary latching means taken on the line 9—9 of FIG. 8, FIG. 10 is a fragmentary, transverse, sectional view taken on the line 10—10 of FIG. 8 and showing the locking means for retaining the latching means in inoperative position, FIG. 11 is a transverse, sectional view taken on the line 11—11 of FIG. 5, FIG. 12 is a fragmentary view generally similar to the upper portion of FIGS. 5 and 6 but showing the start of the means for resetting or "cocking" the device after it has been actuated, FIG. 13 is an exploded view of the component parts of the device disclosed in FIG. 5, and FIG. 14 is an exploded view of the parts generally concealed in FIG. 13 and shown in section FIG. 8.

Referring first to FIGS. 1 and 2, there is shown a towing vehicle V and a trailer T connected thereto, the trailer having a tongue carrying a vertical post which houses the jack for supporting the front end of the trailer when uncoupled and to which the body of the device of the present invention 1 is attached by clamp bands 2, 2 surrounding the post and the body of the device. A conduit C leads from a connection with the braking system of the towing vehicle to an inlet fitting 3 on the device and a conduit C' leads from the device to the trailer brakes. The towing vehicle brakes B are operated by a master cylinder M and foot pedal P. Normally, the trailer brakes B' are connected through the device for operation by the towing vehicle master cylinder by fluid connections extending through the device as will hereinafter be more fully disclosed.

The device, other than the electrical control connections, comprises the cylindrical body 1 which is composed of a cylinder 4 externally threaded at one end thereof and engaging complementary threads on one end of a cylindrical housing 5. The cylinder 4 at the said externally threaded end is provided with an axial bore 6 forming a chamber in which a piston 7 reciprocates, said piston having an external sealing ring 8 engaging the wall of said bore. The opposite end of the cylinder is provided with an axial bore 9 communicating with the bore 6 at one end thereof and which at the other end thereof communicates with a counterbore portion 10 which is threaded for optional reception of either a valve carrying fitting 11 or a re-setting screw carrying fitting 12 (see FIG. 12) as will hereinafter be explained. The inlet fitting 3 engages a threaded port 13 in the sidewall of the cylinder 4 and the port 13 is connected by a passage 14 with the counterbore 10. A rate of flow responsive check valve means is interposed between the fitting 3 and the port 13 comprising a perforated washer 15 seated in the bottom of the counterbore 10 and against which a check valve ball 16 is normally yieldingly pressed by a spring 17 housed within a counterbore 18 in the fitting 3, the check valve thus being normally open to fluid flow but in the event of rapid rate of reverse flow, the ball will be seated on the shoulder 19 within the fitting and against the bias of the spring 17 thus preventing reverse flow of the brake fluid (see FIG. 6). The sidewall of the cylinder is also provided with a passage 20 affording communication between the interior of the cylinder and the outlet fitting 21 which is connected to one end of the trailer brake conduit C' which fitting threadedly engages the counterbore 22 forming the extension of the passage 20. A second rate of flow responsive check valve means is interposed between the passage 20 and fitting 21 comprising a perforated disk 23 seated in the bottom of the counterbore 22 and the fitting 21 carries a compression spring 24 and a check ball 25 which normally engages the perforated disk 23 under the bias of the spring but which is adapted to effect seating engagement with a seat 26 in the fitting 21 in opposition to the bias of a spring under certain conditions of operation as will be presently explained.

The cylinder 4 is provided with an internally threaded counterbore 27 terminating in a shoulder 28 against which one end of a ring nut 29 engaging the counterbore threads is seated. The nut 29 has an axial bore 30 extending therethrough which is of less diameter than the diameter of the cylinder; said bore terminating at the outer end thereof in a counterbore 31 which joins the bore 30 in a rounded shoulder portion 32. Diametrically oppositely disposed transverse slots 33, 33 in the outer end of the nut 29 afford means for inserting and removing the nut. The bore 30 affords guidance for a piston operating sleeve 34 having one end thereof slidably mounted in said bore; said sleeve being effective through means to be later described, to move the piston toward the head end of the cylinder. Spaced from the piston engaging end of the sleeve 34, it is provided with a series of radially spaced holes 35 disposed in a common plane transverse to the axis of the sleeve and extending through the wall thereof. Mounted in and freely movable in each of said holes is one each of an equal number of balls 36, said balls being of substantially greater diameter than the wall thickness of the sleeve 34 at the point therein through which the holes 35 extend.

The opposite end of the sleeve 34 extends into the casing 5 and adjacent to that end carries an annular flange 37 loosely fitting within the casing 5, said flange being engaged by one end of a heavy helical actuating spring 38, the other end of which rests on a washer 39 secured in the casing 5 by a snap ring 40 engaging a groove 41 on the inner face of the casing. The spring is under a compression bias and normally is held in fully compressed condition by the engagement of the balls 36 with the counterbore shoulder 32. As previously stated, the balls 36 are of greater diameter than the thickness of the sleeve walls and they are normally held projected outwardly of the sleeve by a keeper element 42 slidably mounted in the sleeve and movable toward the end of said sleeve within the nut 29 from an internal shoulder formed in the sleeve at the side of the holes 35 remote from the cylinder 4. The keeper element 42 is secured by a screw 43 to the reduced diameter end portion 44 of a cylindrical latch member 45 which has a cylindrical body 46 slidably engaging the interior of the sleeve 34 at the end thereof carrying the flange 37. That end of the sleeve carries a counterbore 47 terminating in a sloping shoulder 48. The reduced diameter portion 44 of the latch member has an axial bore 49 threaded at its outer end for reception of the screw 43, thence extends toward and into the body portion 46 in a slightly larger bore portion 50 and thence to the end of said body portion in a counterbore 51, the outer end being threaded for reception of a guide and stop screw 52. About midway of its length, the body portion 46 is provided with a plurality of radially spaced holes 53 in each of which a ball 54 of greater diameter than the wall thickness of the body member is mounted. Slidably mounted within the counterbore 51 is the head 55 of a latch keeper element having a shank 56 slidably mounted in an axial bore extending through the guidance stop screw 52. A light compression spring 57 contained within the bore 50 and reacting between the shoulder at the junction of the bores 49 and 50 and the adjacent end of the keeper element head 55 serves normally to maintain the head 55 seated on the end of the screw 52.

Referring to FIGS. 6 and 9, it will be noted that when thus seated, the head 55 causes the balls 54 to be projected out of the holes 53 and that this can only occur when the latch member is so positioned in the sleeve 34 that the holes 53 are in line with the counterbore 47. A washer 58 secured between the head of the screw 52 and the end of the latch element body 46 affords an abutment for one end of a latch releasing compression spring 59 into which the head of the screw 52 extends to serve as a locating means for the spring. The other end of the spring is seated in a shallow socket 60 in the spring seat washer 39. It will also be noted that when the latch member 46 and the keeper 42 attached thereto are positioned to cause the balls 54 to engage the counterbore shoulder 48, the sleeve 34 must also be positioned so that the holes 35 therein are opposite the counterbore 31 so that the keeper 42 may cause the balls 43 to be projected outwardly into the counterbore 31 and be caused to engage the shoulder 32 by the bias of the spring 38. This latched relation of the parts is shown in FIG. 8 and is the normal relation of the parts.

If the keeper element head should be moved into the latch member against the bias of the spring 57 sufficiently to clear the balls 54, the bias of the spring 59 will immediately move the latch member in the same direction, causing the keeper 42 to move out of the path of the balls 36 so that they may move inwardly in the sleeve and thus allow the stored power of the spring 37 to move the sleeve 34 and the piston toward the head of the cylinder with reduction explusion of fluid from the cylinder. By this novel construction, it will be realized that a relatively light force can be employed to release the stored power of the spring 38 which is of the order of approximately 750 lbs. when compressed to its normal operative position.

The means for remotely controlled actuation of this latching means comprises a solenoid device 61 mounted in the end of the casing 5 adjacent to the snap ring 41 and held therein by a second snap ring 62 seated in a groove 63 in the casing, said solenoid having an armature element 64 disposed in the axial line of the casing and adapted to be projected toward the latch mechanism through an axial opening in the washer 39 upon energization of the coil of the solenoid. The solenoid includes a terminal screw 65 projecting out of the casing 5 to which the lead 65' of the coil thereof is connected by a nut 65''. The screw thence extends through an insulating washer 66 having a flange 67 engaging the end of the casing 5 and a nut 68 on the screw serves to clamp one end of an electrical lead 69 against the washer 66 and thus the nut serves both to hold the washer seated against the end of the casing and to effect electrical contact with the lead 69. The other end of the lead 69 is connected to one side of a normally open switch 70 on the instrument panel or other location convenient to the driver of the towing vehicle and the lead 69 in the region of the rear end of the towing vehicle may include a separable connection 71 to effect separation of the portions thereof in event of intended or unintended separation of the vehicles. The other side of the switch is suitably connected to a source of energy, e.g., the battery, of the towing vehicle. The opposite side of the solenoid is grounded and the trailer coupling affords suitable electrical grounding connection with the frame of the towing vehicle. Housed within the spring 59 and extending between the adjacent end faces of the solenoid armature 64 and the end of the shank 56 of the keeper 55 is a plug element 72 operable to transmit the movement of the armature to the latch mechanism.

The end of the sleeve 34, in normal position (see FIG. 5), is substantially flush with the inner face of the ring nut 29 and the adjacent end of the piston 7, being of greater diameter than the sleeve 34, rests on the end surfaces of both the ring nut and the sleeve. The piston 7 has an axial bore 73 extending therethrough in which a cylindrical valve element 74 is guided for free relative axial movement, said cylindrical valve element being considerably longer than the piston and having a diameter slightly less than the internal diameter of the sleeve 34 whereby it rests on the end of the keeper element 42 within the sleeve. A ring gasket 75 mounted in a groove 76 in the axial bore 73 of the piston seals the joint between the valve element and the piston to prevent the escape of fluid therethrough. The end of the valve member 74 disposed within the cylinder chamber carries a snap ring 77 contained in a peripheral groove in the valve member and is effective to be engaged by the end of the piston 7 under certain conditions of operation. At the same end thereof, the valve member 74 carries a ball 78 seated therein and adapted, incident to operative response of the device, to engage the seat formed by the entrance of the bore 9 into the cylinder chamber to seal said bore against the escape of fluid therethrough from the cylinder, such cooperative engagement being shown in FIG. 12.

Assuming that the device is connected between the braking systems of a towing vehicle and a trailer and that the device is set or "cocked" as shown in FIG. 5, and assuming, further, that the driver discovers that there is an approaching brake failure due to escaping fluid, the driver touches the button 70 closing the circuit through the solenoid 61 and this causes the armature 64 thereof to lift the member 72 and the keeper element shank 56 with resultant release of the balls 54 from their locking engagement with the shoulder 48 in the counterbore 47, the balls moving inwardly through their respective holes 53 and into contact with the keeper shank 56. The release of the latching engagement of the balls 54 allows the spring 59 to move the entire latch member axially of the sleeve 34 in the direction of the valve chamber causing the keeper 42 to release the balls 36 from their latching engagement with the shoulder 32 with release of the power of the spring 38 against the sleeve 34 causing the sleeve to move toward the cylinder and to carry the piston 7 with it as shown in FIG. 6 compressing the fluid in the cylinder 4 and forcing the fluid contained within the cylinder through the outlet port and to the trailer brakes. Incident to this upward movement the valve member 74 which rests on the end of the keeper 42 is moved in the same direction by reason of the fact that although this keeper member has initially moved independently of the sleeve, the balls 36 having moved into the space between the internal rib 42' and the adjacent end face of the keeper 42, cause the entire keeper and latch element to move as a unit with the sleeve 34 and the piston together with the valve member 74 as a unit under the influence of the spring 38' to thus close off the inlet bore or passage 9. This force is enough to apply the brakes on the trailer and thus to bring the connected vehicles to a stop even though the brakes on the towing vehicle have failed. If the leak in the braking system has been in the trailer brake system, this sealing of the passage 9 will allow the braking system of the towing vehicle to operate until the vehicles can be brought to a place for service.

After emergency operation of the device and as an incident to restoring the braking system of the two vehicles to operative condition, it is necessary to "re-cock" the device. This must be done before the braking systems are filled with fluid. To accomplish this, the fitting 11 is removed from the cylinder and the fitting 12 is inserted in its stead. The fitting 12 is internally threaded to receive a screw 79 having a pilot end E which engages the valve member 78. The screw 79 is screwed down practically the full length thereof pushing the valve member 74 down with it until, first, the balls 36 are opposite the counterbore 31 and then upon further movement of the screw and the valve member, the keeper 42 moves downwardly forcing the balls outwardly into the counterbore and the continued downward movement by the screw brings the balls 54 opposite the counterbore 47 whereupon the spring 57 moves the keeper element 55 between the balls 54 moving them outwardly into the counterbore 47 thus locking both the sleeve 34 and the latch member 46 as well as the parts associated therewith in their normal position with the springs 38 and 59 each being stressed to the extent of their respective initial operating bias. At such time, the solenoid being de-energized, the operating member 72 is out of engagement with the shank 56 of the keeper 55. Under those conditions, the movement of the valve member 74 by the screw 79 will cause it to occupy the position shown in FIG. 5 wherein the snap ring 77 engaging the piston has also moved the piston into engagement with the ring nut 29. The fitting 12 is then removed and the fitting 11 replaced. Following this, the system is filled with fluid and after it has been substantially filled with fluid, the spring pressed check ball 80 of the fitting 11 is depressed by the hand piece 81 to allow the escape of any entrapped air and until such time as brake fluid flows through the clearance space 82 between the shank of the hand piece 81 and the wall of the fitting. Thereafter, the spring 83 serves to keep the ball 80 in sealing engagement with the end of the fitting.

In connection with this emergency operation of the device, if the approaching failure of the braking system derives from leakage in the system of the towing vehicle, the initial instantaneous movement of the piston 7 will move the check ball 16 into engagement with the shoulder 19 to quickly prevent the escape of fluid and retain all of the fluid possible for use in the trailer braking system. Similarly, if the leakage is in the trailer brakes, this sudden action of the piston will similarly seat the check ball 25 to prevent further loss of fluid through the trailer braking system, allowing the full efficiency of the brakes of the towing vehicle.

The device includes means for emergency actuation of the device incident to unintended separation of the vehicles. To this end, the nut 68 extends for a considerable distance beyond the end of the screw 65 and the screw receiving bore thereof does not extend all the way through the nut. The bore extends in an unthreaded portion 84 beyond the end of the screw 65 and this bore is intersected by a transverse bore 85 extending through the nut. The end of the bore 84 terminates in a reduced diameter bore 86 through which a guide rod portion of a contact member 87 extends. Within the bore 84, the contact member carries a collar portion 88 and a spring 89 within the bore 84 surrounding the contact member 87 and reacting between the end of the bore 84 and the collar 88 tends to urge the contact member toward the end of the screw 65. The transverse bore 85 receives an end of a lead 90 extending directly from the battery of the towing vehicle. Normally, the insulated portion of the lead 90 extends through the transverse bore 85 as shown in FIG. 5. The extreme end of this lead is, however, left bare. In the event of unintended separation of the vehicles, the lead 90 will be pulled through the bore 85 until the bare end of the lead contacts the contact 87 as shown in FIG. 6. This closes the circuit through the solenoid and causes immediate release of the device and consequent application of the trailer brakes. Under these conditions, it is preferable that there be no coupling between sections of the lead 90 so that if there is a breakaway separation of the trailer, there will be no question but what this lead will be pulled through the nut 68 with incident automatic operation of the device.

In FIG. 1a the invention is shown as installed on a motor vehicle by being interposed in the line from the master cylinder to the rear wheel brakes RB of the vehicle. Since a trailer is not involved, the breakaway actuating lead 90 is dispensed with and the actuating lead 69 goes directly to the operating switch without the interposition of the coupling 71.

In this use of the device, assuming a failure of the master cylinder, actuation of the device by closing the switch 70 would close off the line to the master cylinder and apply braking force to the rear wheels of the vehicle. If the failure were due to a leak in the system in a rear wheel cylinder or other location downstream of the device, the actuation of the device would effect the closing off of the affected portion of the system to maintain the integrity of the master cylinder to operate the front wheel brakes.

In addition to being of value for its primary purpose of being operable in the event of braking system failure, it will be obvious that the device will operate to effect an applied braking pressure in the lines to which it is connected on any energization of the solenoid without regard for whether there is a system failure or not. This makes the device additionally useful when the vehicle whose brakes are operable by the device is parked on a grade. Closing the switch by the push button will actuate the device and there being no leak in the braking system, operation of the master cylinder by its foot pedal thereafter will supply sufficient pressure to move the piston 7 and the valve member 74 against the bias of the springs 38 and 59 to the latch retained or "cocked" positions thereof shown in FIG. 5 with incident deactivation of the device when its use is no longer required. The use of the screw 79 is required only when there has been a system failure involving loss and replenishment of brake fluid.

While in the foregoing specification there has been disclosed a presently preferred embodiment of the invention, it is appreciated that in the light of such disclosure, changes and modifications will suggest themselves to others skilled in the art to which the invention appertains. Accordingly, it will be understood that such disclosure is by way of example and that the invention includes as well all such changes and modifications in the parts, and in the construction, combination and arrangement of parts as shall come within the purview of the appended claims.

I claim:

1. In a device for emergency actuation of hydraulic brakes of a vehicle, a cylinder defining a brake fluid containing chamber having an end thereof provided both with a first port affording connection of said chamber with a line extending to the master cylinder of the vehicle braking system and with a second port affording connection of said chamber with a brake line leading to the brakes of at least one pair of wheels other than the wheels connected to the steering means of the vehicle, a piston reciprocable in said cylinder and normally disposed at the end thereof remote from said ported end, an abutment disposed in fixed relation to said cylinder, piston operating devices interposed and reacting between said abutment and said piston comprising a first spring having one end mounted on said abutment, a reciprocable member having one end movable in the end of said cylinder opposite said ports and engaging said piston and having the other end engaging said first spring, latch means normally holding said member retracted with said first spring compressed by such retraction, latch releasing means normally holding said latch means releasably locked in the said normal position thereof, a second spring normally urging said latch releasing means to latch releasing position, a second latch means normally operative to hold said latch releasing means in said locking position, and an operating means including a component accessible to the driver of the vehicle effective to cause release of said second latch means with resultant successive release of said latch releasing means and of the resultantly released power of said first spring to move said piston toward the ported end of said cylinder.

2. An emergency actuator for vehicle brakes as claimed in claim 1 in which said last named operating means comprises a solenoid device having an armature effective upon energization of the coil of said solenoid device to cause disengagement of said second latch means.

3. An emergency actuator for vehicle brakes as claimed in claim 1 in which said first port includes a normally open, rate of flow responsive check valve means effective, in event of a rate of fluid flow therethrough greater than a predetermined rate incident to operation of said piston, to close said first port against fluid flow from said cylinder toward the master cylinder of the vehicle braking system.

4. An emergency actuator for vehicle brakes as claimed in claim 1 including a valve member disposed within said cylinder and operated by said piston operating devices, and effective upon extreme movement of said piston operating devices to engage a valve seat associated with said first port with resultant closing of said first port.

5. An emergency actuator for vehicle brakes as claimed in claim 1 in which said second port is so disposed in said cylinder that movement of said piston to said ported end of said cylinder by said piston operating devices is effective to cause said piston to close said second port.

6. In an emergency actuator for trailer brakes, a cylinder mountable on the trailer and defining a brake fluid containing cavity having an end thereof provided both with a first port affording connection with the braking system of a towing vehicle and with a second port affording connection with said end of said cylinder with a fluid line leading to the trailer brakes with resultant positioning of said ported end of said cylinder in the path of fluid flow between the towing vehicle braking system and the trailer brakes, a piston reciprocable in said cylinder and normally disposed at the end thereof remote from said ported end, an abutment disposed in fixed relation to said cylinder, spring actuated piston operating devices reacting between said abutment and said piston effective to move said piston toward said ported end of said chamber, latch means normally holding said piston operating devices in retracted position, and latch releasing means including an operating means disposed in a position accessible to the driver of the towing vehicle effective to connect said operating means to a source of electrical energy to cause said operating means to release said latch means with resultant liberation of said piston operating devices to cause said piston to move toward said ported end of said chamber and consequent emergency braking action on the trailer brakes, and other normally inactive devices separately connecting said latch release operating means to a source of electrical energy; said other devices being effective as an incident to breakaway separation of the trailer from the towing vehicle to energize said latch release operating means with resultant application of the trailer brakes by said actuator.

7. In an emergency actuator for trailer brakes, a cylinder mountable on the trailer and defining a brake fluid containing cavity having an end thereof provided both with a first port affording connection with the braking system of a towing vehicle and with a second port affording connection with said end of said cylinder with a fluid line leading to the trailer brakes with resultant positioning of said ported end of said cylinder in the path of fluid flow between the towing vehicle braking system and the trailer brakes, a piston reciprocable in said cylinder and normally disposed at the end thereof remote from said ported end, an abutment disposed in fixed relation to said cylinder, spring actuated piston operating devices reacting between said abutment and said piston effective to move said piston toward said ported end of said chamber, latch means normally holding said piston operating devices in retracted position, and latch releasing means including an operating means disposed in a position accessible to the driver of the towing vehicle effective to connect said operating means to a source of electrical energy to cause said operating means to release said latch means with resultant liberation of said piston operating devices to cause said piston to move toward said ported end of said chamber and consequent emergency braking action on the trailer brakes, said operating means comprising a solenoid having a coil connectable to the electrical system of the towing vehicle by the driver thereof and having an armature effective upon energization of said coil to move said latch releasing means to latch releasing position, and other means including a normally open circuit between a source of electrical energy and said coil effective to close said circuit as an incident to breakaway separation of the vehicle with resultant operation of said actuator and application of the trailer brakes.

8. An emergency actuator for trailer brakes including in combination, a cylinder mountable on the trailer and defining a brake fluid containing cavity having an end thereof provided both with a first port affording connection with the braking system of a towing vehicle and with a second port affording connection with said end of said cylinder with a fluid line leading to the trailer brakes with resultant positioning of said ported end of said cylinder in the path of fluid flow between the towing vehicle braking system and the trailer brakes, a piston reciprocable in said cylinder and normally disposed at the end thereof remote from said ported end, an abutment disposed in fixed relation to said cylinder, spring actuated piston operating devices reacting between said abutment and said piston effective to move said piston toward said ported end of said chamber, latch means normally holding said piston operating devices in retracted power storing position, and latch releasing means including an operating means disposed in a position accessible to the driver of the towing vehicle effective to release said latch means with resultant liberation of the stored power of said spring actuated piston operating devices with resultant movement thereby of said piston toward said ported end of said chamber with imposition of emergency braking action on the trailer brakes, a valve seat at the juncture of said first port with said cylinder and a valve member carried by said piston and effective upon extreme movement of said piston by said operating devices to engage said valve seat and close said first port; said port being so disposed relative to said end of said cylinder that extreme movement of said piston toward said end will seal off both of said ports.

References Cited in the file of this patent

UNITED STATES PATENTS

| | | |
|---|---|---|
| 2,160,747 | Mayer et al. | May 30, 1939 |
| 2,734,342 | Mallory | Feb. 14, 1956 |
| 2,814,363 | Phillips | Nov. 26, 1957 |
| 2,940,551 | Euga | June 14, 1960 |
| 2,966,965 | Stair | Jan. 3, 1961 |
| 2,977,156 | Di Gioia | Mar. 28, 1961 |